(12) United States Patent
Rajan

(10) Patent No.: US 9,149,891 B2
(45) Date of Patent: Oct. 6, 2015

(54) WIRE ELECTRODE WITH IMPROVED SLAG PROPERTIES

(75) Inventor: Vaidyanath B. Rajan, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2706 days.

(21) Appl. No.: 11/063,080

(22) Filed: Feb. 22, 2005

(65) Prior Publication Data

US 2006/0186103 A1   Aug. 24, 2006

(51) Int. Cl.
*B23K 9/00* (2006.01)
*B23K 35/02* (2006.01)

(52) U.S. Cl.
CPC .................. *B23K 35/0266* (2013.01)

(58) Field of Classification Search
USPC ............... 219/146.1, 146.23, 146.3, 146.31, 219/146.32, 146.41, 145.1, 145.22
See application file for complete search history.

(56) References Cited

U.S. PATENT DOCUMENTS

| | | | | |
|---|---|---|---|---|
| 2,836,520 A | * | 5/1958 | Longini | 438/352 |
| 2,944,167 A | * | 7/1960 | Matare | 327/510 |
| 3,558,360 A | * | 1/1971 | Sverdrup et al. | 9/33 |
| 4,161,403 A | * | 7/1979 | Shibata | 148/431 |
| 4,345,140 A | | 8/1982 | Godai et al. | |
| 4,432,937 A | * | 2/1984 | Kuwayama et al. | 420/513 |
| 5,114,876 A | * | 5/1992 | Weiner | 117/53 |
| 6,608,284 B1 | * | 8/2003 | Nikodym | 219/137 WM |
| 2003/0178401 A1 | | 9/2003 | Nikodym | |
| 2003/0178402 A1 | | 9/2003 | Nikodym | |

* cited by examiner

*Primary Examiner* — Brian Jennison
(74) *Attorney, Agent, or Firm* — Hahn Loeser & Parks LLP

(57) ABSTRACT

A metal core electrode used to form weld deposits having improved slag forming properties with respect to reduced accumulation of slag in toes of the weld bead. The metal cored electrode includes a metal rod and a fill composition. The electrode includes a slag-modifying additive that contains metallic indium and/or one or more indium compounds.

27 Claims, 2 Drawing Sheets

32N1476 @ 250 WFS ON CLEAN PLATE

32N1476 @ 250 WFS ON CLEAN PLATE

32N1476 @ 450 WFS ON CLEAN PLATE

32NI476 @ 350 WFS OVER MILL SCALE

32NI476 @ 450 WFS OVER MILL SCALE

WIRE ELECTRODE WITH IMPROVED SLAG PROPERTIES

The invention relates generally to the field of welding and more particularly directed to electrodes having improved weld bead formation properties, and even more particularly directed to electrodes that form weld beads with enhanced slag placement and removal properties.

BACKGROUND OF THE INVENTION

In the field of arc welding, the main types of welding processes are gas-metal arc welding with solid (GMAW) or metal-cored wires (GMAW-C), gas shielded flux-cored arc welding (FCAW-G), self shielded flux-cored arc welding (FCAW-S), shielded metal arc welding (SMAW) and submerged arc welding (SAW). Of these processes, gas metal arc welding with solid or metal-cored electrodes are increasingly being used for joining or overlaying metallic components. These types of welding processes are becoming increasingly popular because such processes provide increased productivity and versatility. Such increase in productivity and versatility results from the continuous nature of the welding electrodes in gas metal arc welding (GMAW & GMAW-C), which offers substantial productivity gains over shielded metal arc welding (SMAW). Moreover, these electrodes produce very good looking welds with very little slag, thus saving time and expense associated with cleaning welds and disposing of slag, a problem that is often encountered in the other welding processes.

In gas metal arc welding with solid or metal cored electrodes, a shielding gas is used to provide protection for the weld against atmospheric contamination during welding. Solid electrodes are appropriately alloyed with ingredients that, in combination with the shielding gas, provide porosity free welds with the desired appearance and mechanical properties. In metal cored electrodes, these ingredients are on the inside, in the core (fill) of a metallic outer sheath, and provide a similar function as in the case of solid electrodes.

Solid and metal-cored electrodes are designed to provide, under appropriate gas shielding, a solid, substantially porosity free weld with yield strength, tensile strength, ductility and impact strength to perform satisfactorily in the final applications. These electrodes are also designed to minimize the quantity of slag generated during welding; however, small slag islands and/or one or more thin lines of slag at the toes of the weld are often formed during welding. In general, these slag islands are oxides of manganese and silicon that are formed, when these elements that are present in the wire react with oxygen during welding. After welding, these slag islands or slag lines are removed to provide a clean surface that, if desired, can be later treated (e.g. painted or coated) to enhance appearance, inhibit corrosion, etc. Failure to remove the slag can result in peeling of the slag after the weld has been painted or coated, which can result in corrosion at that site or negatively impact the cosmetic appearance of the weld.

Metal-cored electrodes are used increasingly as an alternative to solid wires because of increased productivity during welding fabrication of structural components. Metal cored electrodes are composite electrodes consisting of a core (fill) material surrounded by a metallic outer sheath. The core consists mainly of iron powder and alloying and fluxing ingredients to help with arc stability, weld wetting and appearance etc., such that the desired appearance and mechanical properties are obtained in the weld. Metal cored electrodes are manufactured by mixing up the ingredients of the core material and depositing them inside a formed strip, and then closing and drawing the strip to the final diameter. Metal-cored electrodes provide increased deposition rates and produce a wider, more consistent weld penetration profile compared to solid electrodes. Moreover, they provide improved arc action, generate less fume and spatter, and provide weld deposits with better wetting compared to solid electrodes. However, these productivity improvements are sometimes offset by the expense incurred because of the time required to remove the slag deposits or islands, which form on the surface of the weld.

In general, in gas metal arc welding with solid or metal cored wires, the slag islands tend to form at the toes of the weld. The slag islands get wedged in the toes and this makes them very difficult to remove. In this invention, addition of ingredients to the core (fill) of the metal core electrode have been made, which allow for the slag to form as discrete islands in the middle of the weld, instead of the toes of the weld. This allows the slag islands to either self detach or be removed easily.

Several fill compositions have been developed to address the slag removal problem. In U.S. Pat. No. 4,345,140 to Godai, a flux composition use in a cored electrode for welding stainless steel is disclosed. Godai discloses that the addition of low melting point metallic oxides such as lead oxide, copper oxide, bismuth oxide, antimony oxide or tin oxide is useful in enhancing the separability of slag. The teachings of Godai are incorporated herein by reference.

Another fill composition having improved slag removal is disclosed in U.S. Pat. No. 6,608,284 to Nikodym. Nikodym discloses a fill composition for a mild steel or low alloy steel electrode. Nikodym distinguishes the disclosed fill composition from the fill composition disclosed in Godai on the basis that Godai is directed to a flux cored electrode for stainless steel welding which is fundamentally different from metal-cored electrodes for mild steel and low alloy steel welding. Nikodym asserts that flux cored electrodes for use in the welding of stainless steel include a flux composition consisting of nonmetallic inorganic components that are present in significantly higher percentages (e.g., 5 to 10%) than in metal cored electrodes for use in the welding of mild or low alloy metals, thus resulting in the slag covering the entire surface of and adhering strongly to the weld bead thereby making it very difficult to remove. The fill composition disclosed in Nikodym includes the addition of antimony, bismuth and/or germanium to a weld metal to cause slag deposits or islands on the weld metal to form at positions away from the toe or edge of mild and low alloy steel weld beads, thereby facilitating the removal of the slag deposits or islands. The teachings of Nikodym are incorporated herein by reference.

SUMMARY OF THE INVENTION

The present invention pertains to an improved welding electrode that facilitates in causing slag deposits or islands on the weld metal to form at positions away from the toe or edge of mild and low alloy steel weld beads, thereby facilitating the removal of the slag deposits or islands. The welding electrode of the present invention is particularly directed to an electrode that includes a fill composition which at least partially protects a weld metal from oxygen and nitrogen throughout the welding process. As such, the fill composition of the present invention is particularly directed to cored electrodes having a metal sheath that surrounds the fill composition in the core of the sheath; however, the fill composition can be applied to other types of electrodes (e.g., coating on a stick electrodes, etc.), or be used as or part of a flux composition in a submerged arc welding process. As a result, the fill composition is not limited for use in a cored electrode The fill composition of the present invention is particularly formulated for use with electrodes used to weld mild and low alloy steel; however, the fill composition can be used with electrodes for the formation of welding beads on other types of metals. The metal electrode (e.g., metal sheath, solid rod, etc.) is typically formed primarily from iron (e.g., carbon steel, low carbon steel, stainless steel, low alloy steel, etc.); however, the base metal can be primarily formed of other materials (e.g., copper, nickel, titanium, etc.). When the fill composition is used in a cored electrode, the fill composition typically constitutes at least about 1 weight percent of the total electrode weight, and not more than about 50 weight percent of the total electrode weight, and typically about 10-35 weight percent of the total electrode weight, and more typically about 15-25 weight percent of the total electrode weight, and even more typically about 18-22 weight percent of the total electrode weight. The fill composition includes one or more slag forming agents that are used to facilitate the formation of the weld bead, and/or to at least partially shield the formed weld bead from the atmosphere. The fill composition can also include one or more metal alloying agents selected to at least closely match the desired weld metal composition, and/or to obtain the desired properties of the formed weld bead. In one embodiment of the present invention, the fill composition includes indium and/or one or more indium compounds to improve the slag properties of the flux system during and/or after the formation of a weld bead during a welding operation. It has been found that the addition of indium and/or one or more indium compounds to a welding electrode results in the slag deposits or islands formed on the weld bead to form at positions removed from the toe or edge of the weld bead, thereby facilitating the removal of the slag from the weld bead. It has not been determined whether the improved slag properties are the result of the effect of indium and/or one or more indium compounds on the properties of the slag as the slag forms on the weld bead and/or the incorporation of indium and/or one or more indium compounds into the weld metal and the effects of the weld metal properties on the slag formed on the weld metal. The inclusion of indium and/or one or more indium compounds in the welding electrode significantly improves the ease of slag removal. The indium and/or one or more indium compounds is generally incorporated in the fill composition that can be incorporated in the core of a cored electrode, and/or be incorporated in the composition of the metal rod or metal sheath of the welding electrode. Various indium and/or an indium compounds that can be included in the fill composition include, but are not limited to, indium, indium antimonide, indium oxide, indium fluoride, indium sulfate, indium sulfide, or mixtures thereof In one aspect of this embodiment, the indium and/or an indium compound content of the fill composition is generally at least about 0.02 weight percent of the fill composition, typically about 0.05-15 weight percent of the fill composition, more typically about 0.1-8 weight percent of the fill composition, and even more typically about 0.5-2 weight percent of the fill composition. In another and/or alternative aspect of this embodiment, the indium and/or an indium compound content of the welding electrode is generally at least about 0.004 weight percent of the total electrode, and typically about 0.0095-3.23 weight percent of the total electrode, more typically about 0.019-1.72 weight percent of the total electrode, and even more typically about 0.095-0.43 weight percent of the total electrode.

In another and/or alternative aspect of the present invention, the composition of the metal rod or metal sheath of the welding electrode is selected to at least closely match the desired weld metal composition. Typically the metal rod or metal sheath includes a majority of iron when welding a ferrous based workpiece (e.g., carbon steel, stainless steel, etc.); however, the composition of the weld rod can include various types of metals to achieve a particular weld bead composition. In one embodiment of the invention, the metal rod or metal sheath primarily includes iron and one or more other elements such as, but not limited to, aluminum, antimony, bismuth, boron, carbon, cobalt, copper, lead, manganese, molybdenum, nickel, niobium, silicon, sulfur, tin, titanium, tungsten, vanadium, zinc and/or zirconium. In another and/or alternative embodiment of the invention, the metal rod or metal sheath primarily includes iron and one or more other elements such as, but not limited to, aluminum, carbon, chromium, nickel silicon, and/or titanium. In still another and/or alternative embodiment of the invention, the iron content of the metal rod or metal sheath is at least about 80 weight percent of the metal rod or metal sheath.

In still another and/or alternative aspect of the present invention, the fill composition includes one or more weld metal protection agents and/or modifying agents. The components of the fill can include metal alloying agents (e.g., aluminum, boron, calcium, carbon, chromium, iron, manganese, nickel, silicon, titanium, zirconium, etc.) that are at least partially used to provide protection to the weld metal during and/or after a welding procedure, to facilitate in a particular welding procedure, and/or to modify the composition of the weld bead. In one embodiment of the invention, the fill composition includes at least one of the weld metal protection agents. In another and/or alternative embodiment of the invention, the fill composition includes one or more alloying agents used to facilitate in forming a weld metal with the desired composition. In one aspect of this embodiment, the alloying agent constitutes about 0.1-99.3 weight percent of the fill composition. In still another and/or alternative embodiment of the invention, the fill composition includes one or more slag modifiers. The slag modifiers are typically used to increase and/or decrease the viscosity of the slag, to improve the ease of slag removal from the weld metal, reduce spattering, etc.

In still yet another and/or alternative aspect of the present invention, a shielding gas is used in conjunction with the welding electrode to provide protection to the weld bead from elements and/or compounds in the atmosphere. The shielding gas generally includes one or more gases. These one or more gases are generally inert or substantially inert with respect to the composition of the weld bead. In one embodiment, argon, carbon dioxide or mixtures thereof are at least partially used as a shielding gas. In one aspect of this embodiment, the shielding gas includes about 2-40 percent by volume carbon dioxide and the balance of argon. In another and/or alternative aspect of this embodiment, the shielding gas includes about 5-25 percent by volume carbon dioxide and the balance of argon. As can be appreciated, other and/or additional inert or substantially inert gases can be used.

It is a primary object of the invention to provide a welding process that results in improved slag properties on the weld bead.

Another and/or alternative object of the present invention is the provision of a welding process that reduces the amount of slag formed and the amount of slag that is in and/or near the toes of the weld bead.

Still another and/or alternative object of the present invention is the provision of a welding electrode that includes indium and/or one or more indium compounds to improve the characteristics of slag formed on a weld bead.

Yet another and/or alternative object of the present invention is the provision of a metal cored welding electrode that includes indium and/or one or more indium compounds in the fill of the electrode to improve the characteristics of slag formed on a weld bead.

These and other objects and advantages will become apparent from the discussion of the distinction between the invention and the prior art and when considering the preferred embodiment as shown in the accompanying drawings.

DETAILED DESCRIPTION OF THE INVENTION

Referring now in greater detail to the drawings, wherein the showings are for the purpose of illustrating preferred embodiments of the invention only, and not for the purpose of limiting the invention, FIGS. 1A-1D illustrate the slag formation on a fillet weld bead formed from a cored electrode in accordance with the present invention. The cored electrode was formulated to weld mild steel; however, it can be appreciated that the welding electrode could have been formulated to weld other types of metal (e.g., stainless steel, high strength steel, etc.). The weld beads illustrates in FIGS. 1A-1D were formed by a robot welder at about 13/16 inch CTWD (contact tip to work distance), about a 10° push angle and about a 45° gun angle. The shielding gas mixture used during the welding process was about 90% AR and about 10% $CO_2$. The weld settings that were used on mill scale plates were 1) 24 V/250 ipm WFS (wire feed speed) at about 12 ipm travel speed, 2) 26 V/350 ipm WFS at about 16 imp travel speed, 3) 28 V/450 ipm WFS at about 20 ipm travel speed.

Figure 1A:
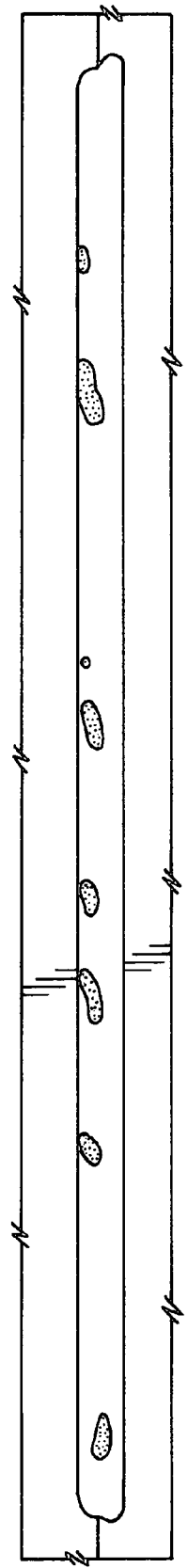
FIGS. 1A-1D are illustrations of weld beads form by a cored electrode in accordance with the present invention at various wire feed speeds.
Figure 1B:
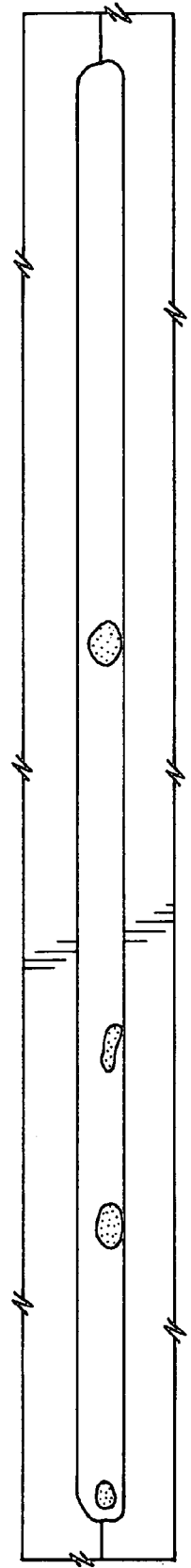
Figure 1C:
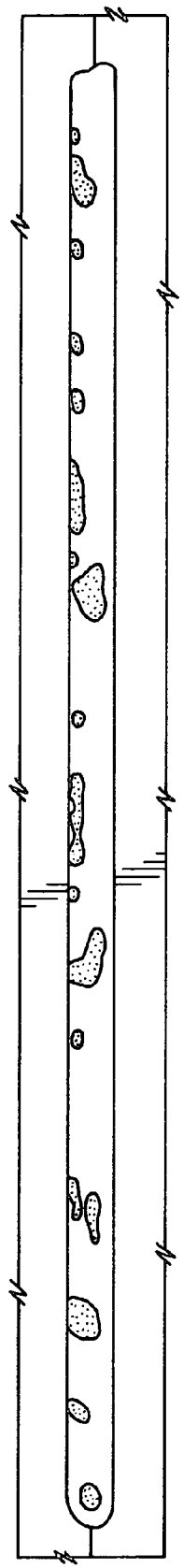
Figure 1D:
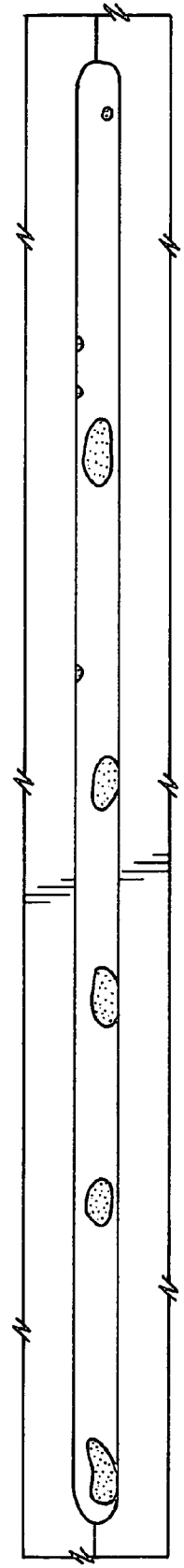

FIGS. 1A and 1B illustrate fillet welds made on clean plates at two different wire feed speeds. As illustrated in these figures, most of the slag formed by the electrodes is spaced away from the edge of the weld bead and is deposited in discrete slag formations as opposed to being spread out along the length of the weld bead at the toes. FIGS. 1C and 1D illustrate fillet welds made on mill scale plates by the electrodes of the present invention at two different wire feed speeds. Once again, most of the slag formed by the present invention is spaced away from the edge of the weld bead, and is substantially deposited in discrete slag formations as opposed to being spread out along the length of the weld at the toes. In addition, the bead wetting and appearance on both clean plate and mill scale plate is excellent.

The metal sheath that can be used to form the weld bead can include about 0-0.2 weight percent B, about 0-0.2 weight percent C, about 0-12 weight percent Cr, about 0-5 weight percent Mn, about 0-2 weight percent Mo, about 0-5 weight percent Ni, about 0-4 weight percent Si, about 0-0.4 weight percent Ti, about 0-0.4 weight percent V and about 75-99.9 weight percent Fe. The general formulation of the metal sheath used to form the weld beads in FIG. 2 includes about 0.02-0.044% carbon, about 0.007-0.014% silicon, about 0.02-0.06% aluminum, about 0.01-0.05% chromium, about 0.01-0.04% nickel, less than about 0.014% phosphorus, less than about 0.02% sulfur, less than about 0.01% nitrogen and less than about 0.01% titanium and the balance iron and nominal impurities.

Metallic indium may also be included in the metal sheath; however, indium and/or one or more indium compounds are typically included in the fill of the cored electrode. These elemental compositional ranges can be solely included in the metal sheath or be a combination of the metal sheath composition and one or more components of the fill composition. The composition of most welding electrodes used for welding mild steel or low alloy steel will include at least about 0.4 weight percent Mn, at least about 0.2 weight percent Si, and at least about 0.001 weight percent C. Industry standards for many mild and low alloy steels limit the combined amounts of B, Cr, Ni, Mo, V, and Ti to less than about 1 weight percent; however, other percentages are acceptable for other types of steel. These elements can be included in the metal sheath, in the fill composition or both to achieve the desired compositional levels.

The fill composition used in a cored electrode constituted about 19-21.5 weight percent of the total electrode weight. The indium addition to the electrode can typically be in the form of metallic indium when added to the metal sheath and was typically indium oxide included in the fill composition; however, the indium can be added in other and/or additional forms such as, but not limited to, indium antimonide, indium fluoride, indium sulfate and/or indium sulfide. The fill composition used to form the weld beads in FIG. 2 included about 6-13% manganese powder, about 3.5-8.5% Si, about 0.06-0.2% iron sulfide, about 0.4-2% indium oxide and about 70-80% iron powder.

The addition of indium and/or one or more indium compounds had no noticeably adverse affect on the quality of the electric arc during the welding process. The addition of indium and/or one or more indium compounds had no noticeably adverse affect on the quality or properties of the formed weld bead. The AWS plate welded with the electrode of the present invention yielded a weld bead having a yield strength of about 63 ksi, a tensile strength of about 79 ksi, and elongation of about 29% and a charpy toughness of 29 ft-lbs @ −20° F. As a result, there was no need to add or increase the amount of alloying agents in the electrode to compensate for the effects of indium and/or one or more indium compounds in the weld electrode.

As illustrated in FIG. 2, the addition of the indium oxide in the fill composition of the welding electrode resulted in the slag formed during the welding procedure to substantially stay in the weld crater, thereby significantly reducing the amount of slag that moved and/or formed on the edges of the weld bead during the welding procedure. It is believed that the indium oxide positively affects the freezing point as well as the surface tension of the formed slag thereby enabling the formed slag to stay in the weld crater.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

I claim:

1. A metal electrode to form a weld bead with improved slag forming properties with respect to reduced accumulation of slag in toes of the weld bead comprising a metal rod, said metal rod comprising a hollow core and a fill composition that is at least partially included in said hollow core, said metal rod or said fill composition further comprising at least one slag-modifying additive, said slag modifying agent selected from the group consisting of metallic indium and indium compounds, said indium compounds selected from the group consisting of indium antimonide, indium fluoride, indium oxide, indium sulfate, indium sulfide, or mixtures thereof, said metallic indium or indium compounds causing slag deposits or islands on said weld bead to more easily be removed from said weld bead and to form at positions away from said toes of said weld bead when compared to said weld bead without the addition of said metallic indium, indium compounds or mixtures thereof for mild and low alloy steel weld beads.

2. The metal electrode as defined in claim 1, wherein said indium compounds are in said fill material.

3. The metal electrode as defined in claim 1, wherein said metallic indium, said indium compounds, or mixtures thereof constitute at least about 0.004 weight percent of the total weight of said electrode.

4. The metal electrode as defined in claim 1, wherein said metal rod includes at least about 80 weight percent iron.

5. The metal electrode as defined in claim 1, wherein said fill material constitutes from about 1-50 weight percent of a total weight of said metal electrode.

6. The metal electrode as defined in claim 4, wherein said metal rod includes at least about 0.002 weight percent carbon, at least about 0.08 weight percent manganese, less than about 0.1 weight percent titanium, and at least about 85 weight percent iron.

7. The metal electrode as defined in claim 6, wherein said metal rod includes about 0-0.5 weight percent aluminum, about 0.02-0.1 weight percent carbon, about 0.005-5 weight percent chromium, about 0.1-3 weight percent manganese, about 0.005-4 weight percent nickel, about 0.001-2.5 weight percent silicon, about 0-0.08 weight percent titanium, and at least about 90 weight percent iron.

8. The metal electrode as defined in claim 1, wherein said fill composition includes at least about 0.1 weight percent manganese; at least about 0.1 weight percent silicon; at least about 0.1 weight percent said metallic indium, said indium compound, and mixtures thereof; and at least about 65 weight percent iron powder.

9. The metal electrode as defined in claim 8, wherein said fill composition includes about 0-1 weight percent iron sulfide, about 0.1-15 weight percent manganese, about 0.1-8 weight percent silicon, about 0.1-4 weight percent indium oxide, and at least about 70 weight percent iron powder.

10. The metal electrode as defined in claim 5, wherein said fill composition constitutes about 15-35 weight percent of a total weight of said metal electrode.

11. The metal electrode as defined in claim 1, wherein said metallic indium, said indium compounds, or mixtures thereof constitutes about 0.0095-15 weight percent of the total weight of said electrode.

12. The metal electrode as defined in claim 11, wherein said metallic indium, said indium compounds, or mixtures thereof constitutes about 0.095-0.43 weight percent of the total weight of said electrode.

13. The metal electrode as defined in claim 4, wherein said metal rod includes about 0.02-0.044% carbon, about 0.07-0.014% silicon, about 0.02-0.06% aluminum, about 0.01-0.05% chromium, about 0.01-0.04% nickel, less than about 0.014% phosphorus, less than about 0.02% sulfur, less than about 0.01% nitrogen and less than about 0.01% titanium and a majority of iron.

14. The metal electrode as defined in claim 9, wherein said fill material includes about 6-13% manganese powder, about 3.5-8.5% Si, about 0.06-0.2% iron sulfide, about 0.4-2% indium oxide and about 70-80% iron powder.

15. A metal electrode to form a weld bead with improved slag forming properties with respect to reduce accumulation of slag in toes of the weld bead comprising a metal rod that includes a slag-modifying additive, said metal rod includes a hollow core and a fill composition that is at least partially included in said hollow core, said fill material constituting from about 1-50 weight percent of a total weight of said metal electrode, at least one of said slag-modifying agent selected from the group consisting of metallic indium, indium compounds, or mixtures thereof, and further wherein said indium compounds are selected from the group consisting of indium antimonide, indium fluoride, indium oxide, indium sulfate, indium sulfide, or mixtures thereof, said metallic indium, said indium compounds, or mixtures thereof constituting at least about 0.004 weight percent of the total weight of said electrode, said metallic indium or indium compounds causing slag deposits or islands on said weld bead to more easily be removed from said weld bead and to form at positions away from said toes of said weld bead when compared to said weld bead without the addition of said metallic indium, indium compounds or mixtures thereof for mild and low alloy steel weld beads.

16. The metal electrode as defined in claim 15, wherein said metallic indium, indium compounds, or mixtures thereof constitutes about 0.0095-15 weight percent of the total weight of said electrode.

17. The metal electrode as defined in claim 16, wherein said metallic indium, indium compounds, or mixtures thereof constitutes about 0.019-1.72 weight percent of the total weight of said electrode.

18. The metal electrode as defined in claim 17, wherein said metallic indium, indium compounds, or mixtures thereof constitutes about 0.095-0.43 weight percent of the total weight of said electrode.

19. The metal electrode as defined in claim 15, wherein said metal rod includes at least about 0.002 weight percent carbon, at least about 0.08 weight percent manganese, less than about 0.1 weight percent titanium, and at least about 85 weight percent iron.

20. The metal electrode as defined in claim 19, wherein said metal rod includes about 0.02-0.044% carbon, about 0.07-0.014% silicon, about 0.02-0.06% aluminum, about 0.01-0.05% chromium, about 0.01-0.04% nickel, less than about 0.014% phosphorus, less than about 0.02% sulfur, less than about 0.01% nitrogen and less than about 0.01% titanium.

21. The metal electrode as defined in claim 19, wherein said metal rod includes about 0-0.5 weight percent aluminum, about 0.02-0.1 weight percent carbon, about 0.005-5 weight percent chromium, about 0.1-3 percent manganese, about 0.005-4 weight percent nickel, about 0.001-2.5 weight percent silicon, about 0-0.8 weight percent titanium, and at least about 90 weight percent iron.

22. The metal electrode as defined in claim 15, wherein said fill composition includes at least about 0.1 weight percent manganese; at least about 0.1 weight percent silicon, at least about 0.1 weight percent said slag-modifying agent selected from the group consisting of said metallic indium, said indium compounds, or mixtures thereof, and at least about 65 weight percent iron powder.

23. The metal electrode as defined in claim 18, wherein said fill composition includes at least about 0.1 weight percent manganese; at least about 0.1 weight percent silicon, at least about 0.1 weight percent said slag-modifying agent selected from the group consisting of said metallic indium, said indium compounds, or mixtures thereof, and at least about 65 weight percent iron powder.

24. The metal electrode as defined in claim 22, wherein said fill composition includes about 0-1 weight percent iron sulfide, about 0.1-15 weight percent manganese, about 0.1-8 weight percent silicon, about 0.1-4 percent indium oxide, and at least about 70 weight percent iron powder.

25. The metal electrode as defined in claim 23, wherein said fill composition includes about 0-1 weight percent iron sulfide, about 0.1-15 weight percent manganese, about 0.1-8 weight percent silicon, about 0.1-4 percent indium oxide, and at least about 70 weight percent iron powder.

26. The metal electrode as defined in claim 24, wherein said fill material includes about 6-13% manganese powder, about 3.5-8.5% Si, about 0.06-0.2 iron sulfide, about 0.4-2% indium oxide and about 70-80% iron powder.

27. The metal electrode as defined in claim 25, wherein said fill material includes about 6-13% manganese powder, about 3.5-8.5% Si, about 0.06-0.2% iron sulfide, about 0.4-2% indium oxide and about 70-80% iron powder.

* * * * *